United States Patent

[11] 3,609,046

[72] Inventor Gerhart Lothar Hamburger
    Welwyn, England
[21] Appl. No. 835,682
[22] Filed June 23, 1969
[45] Patented Sept. 28, 1971
[73] Assignee Sangamo Weston Limited
    Enfield, Middlesex, England
[32] Priority June 25, 1968
[33] Great Britain
[31] 30307/68

[54] PHOTOELECTRIC EXPOSURE METERS
    18 Claims, 16 Drawing Figs.
[52] U.S. Cl. .................................... 356/222,
    356/224, 356/225, 356/226
[51] Int. Cl. .................................... G01j 1/42,
    G01j 1/44
[50] Field of Search .................................... 356/222,
    224, 225, 226, 186

[56] References Cited
    UNITED STATES PATENTS
| | | | |
|---|---|---|---|
| 2,891,438 | 6/1959 | Fuhrmann et al. | 356/226 X |
| 2,952,184 | 9/1960 | Bakke et al. | 356/222 X |
| 2,994,246 | 8/1961 | Kawa et al. | 356/222 |
| 2,995,975 | 8/1961 | Balchunas et al. | 356/222 X |
| 3,147,680 | 9/1964 | Stimson | 356/226 X |
| 3,225,646 | 12/1965 | Nagai | 356/222 |
| 3,421,821 | 1/1969 | Alessi | 356/186 |

OTHER REFERENCES
Gosser, " P.S.A." Journal, pp. 10-11, Dec., 1966

Primary Examiner—Ronald L. Wibert
Assistant Examiner—Warren A. Sklar
Attorney—Young & Thompson ABSTRACT: Photoelectric exposure meter including a selenium photocell coupled to an electrical measuring instrument calibrated in light values and a separate attachment including a second, cadmium sulfide type of photocell and a battery for extending the measuring range to lower light values, said attachment being mountable over the selenium cell on the exposure meter by a bayonet-type fixing including contact plates which engage other contacts on the exposure meter to couple the second cell to the measuring instrument whereby the latter is operated by current derived from the second photocell. A transistor amplifier is included in the attachment together with switching means in which the single-mercury cell battery forms the movable switch contact.

PATENTED SEP 28 1971 3,609,046

INVENTOR
GERHART LOTHAR HAMBURGER
By Young + Thompson
ATTYS.

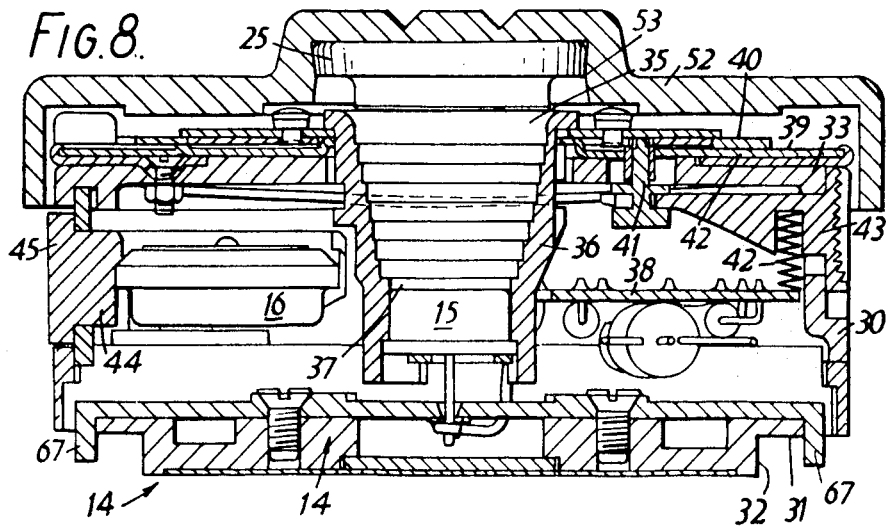
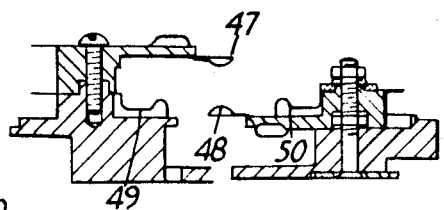
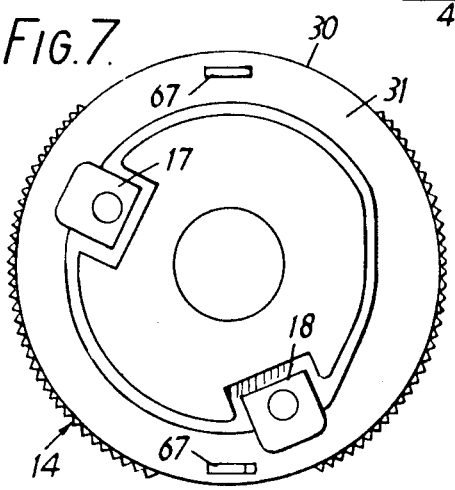
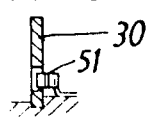
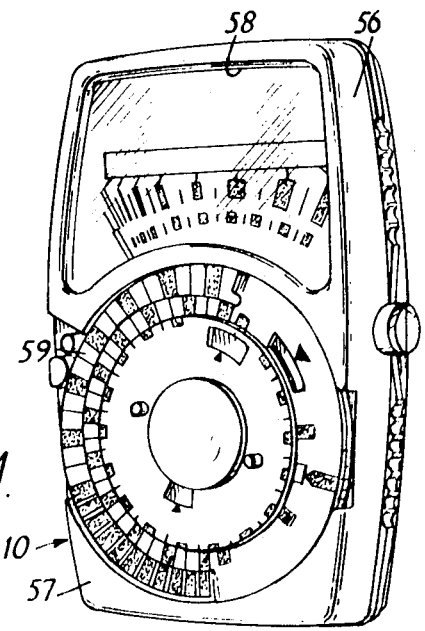

INVENTOR
GERHART LOTHAR HAMBURGER
By Young & Thompson
ATTYS.

PHOTOELECTRIC EXPOSURE METERS

This invention relates to photoelectric exposure meters and is more particularly concerned with the provision of an improved arrangement having greater sensitivity and capable of measuring an increased range of light intensity values or equivalent photographic stop, exposure or other values.

In accordance with one aspect of this invention there is provided for a photoelectric exposure meter comprising a first casing having a first light entry aperture in a wall thereof, attachment holding means in the vicinity of the said first light entry aperture, a first photosensitive device located within said casing for exposure to light entering through said first light entry aperture, an electrical measuring instrument calibrated in light or equivalent photographic values, electric circuit means connecting said measuring instrument with said first photosensitive device to be energized by a current which varies in amplitude in accordance with the degree of illumination of said first photosensitive device by light entering said first light entry aperture and external electric connector means on said casing and connected to said electrical measuring instrument, an attachment for extending the measurement range of said meter to light values of lower intensity, which attachment comprises a second casing having a second light entry aperture in a wall thereof, a second photosensitive device located within said second casing for exposure to light entering through such second light entry aperture, external electrical connector means connected to said second photosensitive device and attachment means for cooperating with said attachment holding means on said first casing to hold said attachment in a position which closes said first light entry aperture against the passage of light therethrough onto such first photosensitive device and with said external electric connector means cooperating with the external electrical connector means of said first casing to connect said second photosensitive device to said electrical measuring instrument in an electric circuit by means of which said measuring instrument is energized in accordance only with the degree of illumination of said second photosensitive device.

In accordance with another aspect of the invention an arrangement for measuring a plurality of different ranges of light intensity values either in direct terms of light intensity or as equivalent photographic exposure or other values comprises a photoelectric exposure meter including a first casing having a first light entry aperture in a wall thereof, a first photosensitive device located within said casing for exposure to light entering through said light entry aperture, an electrical measuring instrument calibrated in light or equivalent photographic values, electric circuit means connecting said measuring instrument with such first photosensitive device to cause energization of such measuring instrument by a current which varies in amplitude in accordance with the degree of illumination of said first photosensitive device by light entering said light entry aperture, attachment holding means on said first casing in the vicinity of said first light entry aperture and external electric connector means electrically connected to said electrical measuring instrument and an attachment arranged for detachable mounting on said first casing and comprising a second photosensitive device, attachment means cooperating with said attachment holding means of said first casing to secure said attachment to said first casing in a position completely obscuring said first light entry aperture from the entry of light therethrough onto said first photosensitive device and external electric connector means cooperating with said external electric connector means connecting said second photosensitive device into the circuit of said electrical measuring instrument whereby said measuring instrument is energized solely in accordance with the illumination incident upon said second photosensitive device when said attachment is in position and whereby said measuring instrument is energized only in accordance with the degree of illumination incident upon said first photosensitive device when said attachment is removed from said meter.

In order that the nature of the invention may be more readily understood, certain embodiment of the invention will now be described by way of illustrative example only and with reference to the accompanying drawings in which:

FIG. 6 is an underside elevation and FIG. 7 is a rear elevational view of one particular form of attachment embodying the invention.

FIG. 8 is a diametral cross-sectional view through the attachment of FIGS. 4–7.

FIGS. 9 and 10 are fragmentary detail views of parts of the structure shown in FIG. 8.

FIG. 11 is a front perspective view.

FIG. 14 is a fragmentary perspective view illustrating the interengagement relationship between the exposure meter of FIGS. 11–13 and the attachment of FIGS. 4–10 while FIGS. 15 and 16 are fragmentary perspective views showing in detail the construction of the interengagement and circuit connection means on the exposure meter and on the attachment.

Figure 1:
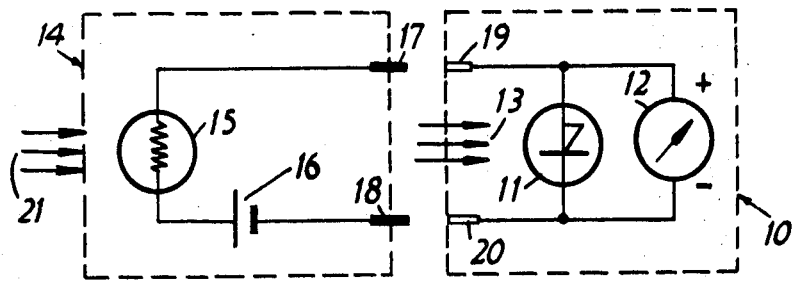
FIG. 1 is a circuit diagram showing one known form of photoelectric exposure meter and an attachment therefor constructed in accordance with the invention.

Referring first to FIG. 1, the dotted rectangle 10 indicates one conventional form of photoelectric exposure meter which comprises a photosensitive device 11 in the form of a current generating photocell, e.g. a selenium cell, which is connected to supply its output current to an electrical measuring instrument 12, e.g. of the moving coil type, which is appropriately calibrated in suitable photographic terms such as light values. The photocell 11 is arranged to be exposed to light incident in the direction of the arrows 13. Usually a baffle or equivalent ray direction selective means is provided to limit the angle of incidence of the light falling upon the cell while such baffle or direction selective means often incorporate adjustable light-restricting means to allow provision of one or more light measurement ranges by the meter 12. Such conventional exposure meters generally have a measurement range which terminates, at the lower intensity end, at a brightness value of around 0.2 candles/sq. ft.

In order to allow extension of the measurement range of the meter 10 to still lower brightness values the present invention provides an attachment indicated by the dotted line rectangle 14 and comprising a second photoelectric device in the form of a second photocell 15. This cell is conveniently of the photoconductive type, e.g. a cadmium sulfide cell, and is connected in series with a current source in the form of a dry battery 16 of appropriate voltage, the series arrangement of cell 15 and battery 16 being connected across a pair of externally directed contacts 17 and 18. These contacts 17 and 18 are mounted upon the casing of the attachment 14 and are adapted to enter into engagement with cooperating contacts 19 and 20 mounted upon the exposure meter 10. The contacts 19, 20 provide connections to the measuring instrument 12 of the meter 10 whereby such instrument completes the circuit through the photocell 15 and the battery 16 when the attachment 14 is placed in position on the meter 10.

The act of applying the attachment 14 to the exposure meter 10 so as to engage the contacts 17, 18 with the contacts 19, 20 is arranged automatically to mask the photocell 11 of the meter 10 from all light. In consequence of the photocell 11 being completely darkened it does not provide any output current to the measuring instrument 12 and is of very high resistance whereby its shunting effect on such measuring instrument 12 is negligible. Any light incident on the cell 15, as indicated by the arrows 21, now causes alteration of the resistance of the photocell 15 thereby to alter the current flow from the battery 16 through the measuring instrument 12. Such an arrangement can readily provide an extension of the sensitivity of the exposure meter 10 to the region of 0.002 candles/sq. ft.

Figure 2:
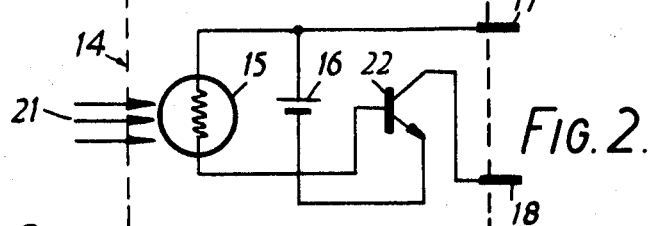
FIG. 2 is a circuit diagram of an alternative form of attachment also in accordance with the invention.

FIG. 2 shows a modified form of the attachment 14 in which a current amplifying transistor 22 is employed. The photocell 15 is now connected in series between the positive terminal of the battery 16, which terminal is also connected to contact 17 and the base of the transistor 22. The latter has its collector connected to the contact 18 and its emitter connected to the negative terminal of the battery 16. The photocell 15 now serves to control the base current flow to the transistor and the collector current of such transistor serves to operate the measuring instrument 12 of the associated exposure meter 10 which is assumed to be constructed in a manner identical with that shown in FIG. 1. The use of an amplifying transistor permits the voltage of the current source battery 16 to be greatly reduced for any given full scale deflection value of the instrument 12; in many instances such battery 16 need be only a single-mercury cell of about 1.35 volts.

Figure 3:
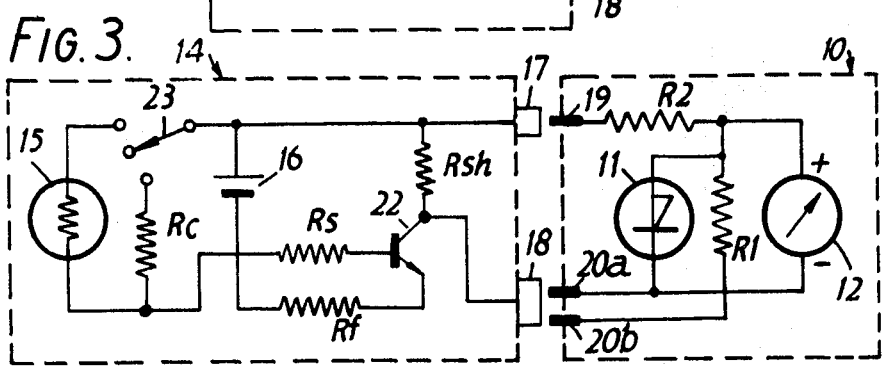
FIG. 3 is a circuit diagram of a preferred form according to the invention of an arrangement comprising a photoelectric exposure meter suitable for conventional use and an attachment therefor according to the invention.
Figure 4:
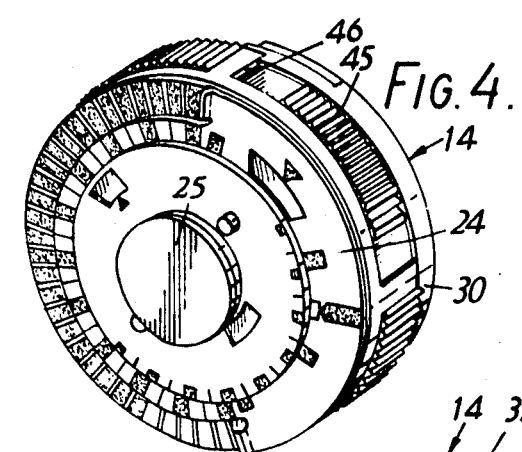
FIG. 4 is a front perspective view.
Figure 5:
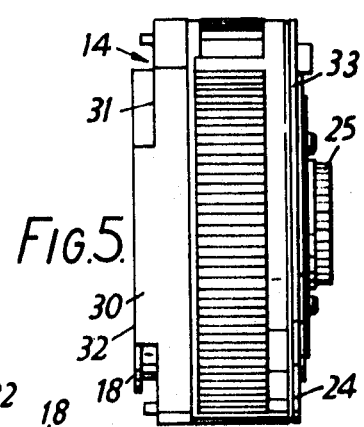
FIG. 5 is a side elevation.
Figure 6:
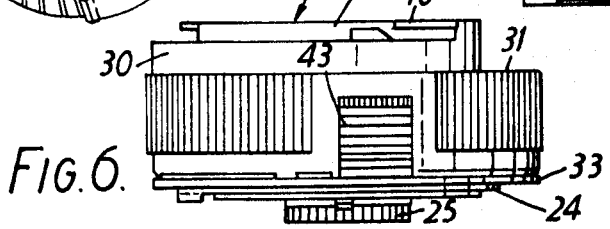

FIG. 3 shows a further and preferred modification according to the invention which is particularly adapted to the commercial construction of attachments 14 as accessories which can be sold separately and at a different time and place from the exposure meters 10 with which they are to be used. Such production requirement means that each attachment may be applied to any specimen of the particular type of exposure meter 10 for which it is designed while maintaining any appropriate degree of accuracy.

In this preferred embodiment the attachment 14 has the second photocell 15, the battery 16 and the amplifying transistor 22 arranged in a manner similar to that of FIG. 2. A three-position switch 23 is provided to allow completion of a circuit including the instrument 12 either through the photocell 15 or through a fixed resistance $Rc$ in addition to an intermediate position which provides an off or out-of-use condition. The value of the resistance $Rc$ is chosen to provide deflection of the measuring instrument 12 of the exposure meter 10 to a chosen reference point on its scale when the voltage of the battery 16 is at a suitable level and thereby serves to afford means for checking the voltage of such battery 16. A fixed resistance $Rs$ is connected in series with the base connection of the amplifying transistor 22 and serves to increase the total light range which can be embraced by the deflection range of the instrument 12 of the associated exposure meter 10. The calibration of the scale of the meter 12 is frequently in terms of "spot" values and the number of such spot markings can be increased and the linearity of their mutual spacing improved by appropriate choice of the value of the resistance $Rs$. A further fixed value resistance $Rf$ is provided in series with the connection between the emitter of the transistor 22 and the negative terminal of the battery 16 to provide a measure of current feedback which is operative to reduce the effects of differences between the characteristics of the respective transistors 22 which are used in production of a batch of the attachments. Such feedback resistance also improves the linearity of the calibration markings towards the upper end of the scale range of the instrument 12. A further fixed value resistance $Rsh$ which is, effectively connected across the instrument 12 when the attachment is in use, serves to shunt away excess current which may be caused by the transistor gain being higher than a certain predetermined minimum.

In the associated exposure meters 10 with any one of which any one attachment 14 may be used, production variations of the characteristic of the photocells 11 and variations in the sensitivities of the associated instrument 12 are met by incorporating a high value shunt resistance $R1$ for connection across the meter 12 whenever the attachment 14 is in use while a series resistance $R2$ is provided between the fixed contact 19 of the meter and the common connection point between the positive terminal of the meter and the related terminal of the photocell 11. Separate contacts 20a and 20b, normally insulated from one another, are provided on the exposure meter 10 and arranged each to be engaged by a common contact 18 on the attachment 14. By these means the contacts 20a and 20b become bridged only when the attachment 14 is in place, so that both of the resistances $R1$ and $R2$ are inoperative whenever the exposure meter 10 is being used without the attachment. The application of an attachment to a photo exposure meter with the consequent engagement of contacts 17 and 18 with contacts 19 and 20 a, 20b automatically brings the resistance $R1$ into shunting connection across the instrument 12 and places the resistance $R2$ in series with the battery and the second photocell 15 through the transistor 22. The resistances $R1$ and $R2$ have values chosen to make each exposure meter present predetermined resistance or deflection sensitivity value to any attachment 14.

Referring now to FIGS. 4–10, the particular form of the attachment 14 shown therein comprises a shallow cylindrical casing 30 the rearward wall 31 of which is provided with a nearly circular axially directed extension 32 carrying two radially directed contact plates 17 and 18 which serve the dual purpose of locking the attachment in position upon the associated exposure meter and simultaneously establishing the necessary electrical connections between the attachment and the meter and also within the meter itself as already described above with reference to FIG. 3. The front wall 33 of the attachment, which is the one caused to face the field whose illumination is to be measured, includes an exposure calculator mechanism 24 surrounding a central aperture 35 (see FIG. 8). As shown more clearly in FIG. 8, the latter is at one end of a central hollow stem 36 having an internal bore of stepped profile presents a series of progressively smaller diameter and nonreflecting zones leading to an inner aperture 37 lying immediately adjacent the light sensitive region of a cadmium sulfide photocell 15. The circuit components as shown within the dotted line rectangle 14 in FIG. 3, except the photocell 15 and switch 23, are mainly supported upon an annular-shaped printed circuit board 38 which is disposed around the central hollow stem 36 and secured in position as shown. The exposure calculator 24, in the form of superimposed rotatable metal plates 39, 40 is also mounted around the central stem 36.

The plate 40 may be locked in any one of a number of adjustment positions by means of a plunger 41 entering one of a number of spaced holes in the plate. Such plunger 41 can be withdrawn against the action of a spring 42 by a movable thumb piece 43.

The switch shown at 23 in FIG. 3 is constituted in the construction of FIGS. 4–10, by a mechanism wherein the battery 16 in the form of a miniature mercury cell of button-shape serves also as the movable or rotor contact. This cell 16 is located within a retaining pocket in a member 44 of moulded plastic insulating material which can be moved along an arcuate path by means of an outwardly projecting serrated or roughened finger piece 45 projecting through an arcuate slot 46 in the outer wall of the casing 30 to permit its operation by an arcuate movement about the axial line of the casing in either direction from a central off position which is that shown in FIG. 4. The mercury cell 16 is located between opposed spring contact arms 47, 48 (FIG. 9) which make connection respectively with its opposite end terminals, while further resilient switch contact arms as shown at 49, 50 in FIG. 9, serve also to contact the cell when in either one of its two opposite end positions to establish connections in accordance with the circuit diagram of FIG. 3. A spring detent as shown at 51 in FIG. 10 cooperates with notches or apertures in the casing 30 to lock the switch in any chosen position.

A central snap-on cap 25 is provided for closing the outer end aperture of the stem leading to the cell 11 so as to prevent ingress of dirt and other foreign material when not in use, while a further outer bell-shaped cover 52, also of plastic material, may be provided to cover the whole of the attachment by engagement of a central recess 53 therein with the outer edge of the cover 25.

Figures 12, 13:
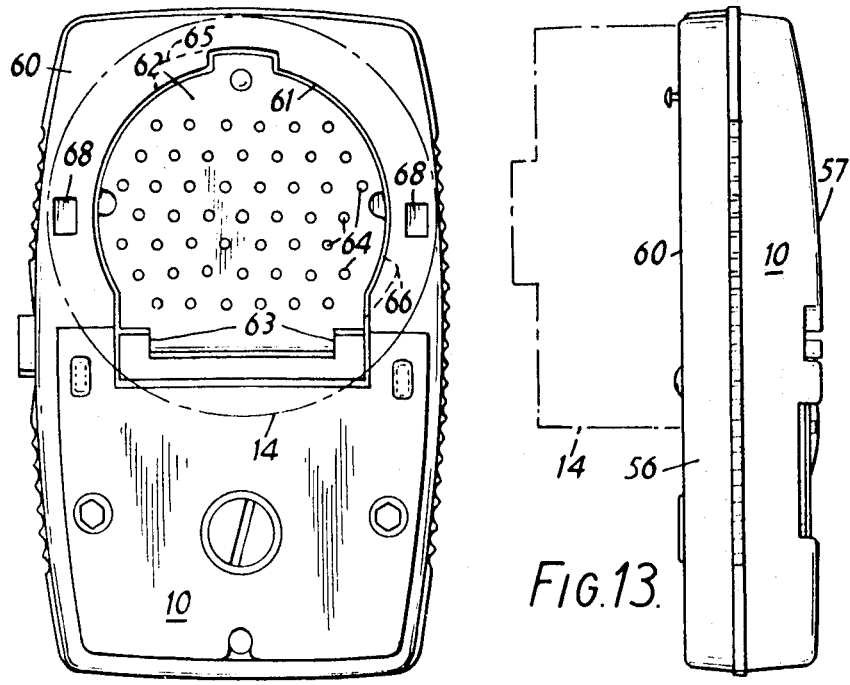
FIG. 12 is a rear elevational view.
FIG. 13 is a side elevational view of one form of photoelectric exposure meter particularly adapted for use with an attachment as shown in FIGS. 4–10, the said attachment being indicated in chain-dotted lines in its operative position in FIGS. 12 and 13.

Referring now to FIGS. 11, 12 and 13, the cooperative photoelectric exposure meter 10 consists of a main outer casing 56 having a front wall 57 containing a window aperture 58 for viewing the pointer of the incorporated electrical measuring instrument. This front wall 57 also carries the normal exposure calculator 59 dealing with the range of light values which can be measured by the meter in its original, unmodified form.

The opposite or rear wall 60 of the casing 56 is provided with a substantially circular opening 61 surrounding the light sensitive area of the internal selenium cell which forms the inbuilt photosensitive device of the exposure meter. A masking flap 62 arranged to fit within such opening 61 and hinged at 63, contains a number of spaced apertures 64 therein and operates as a removable mask for reducing the sensitivity of the exposure meter and thereby extending the range of light values which can be measured thereby in an upward or increasing light value direction.

Figures 14, 15, 16:
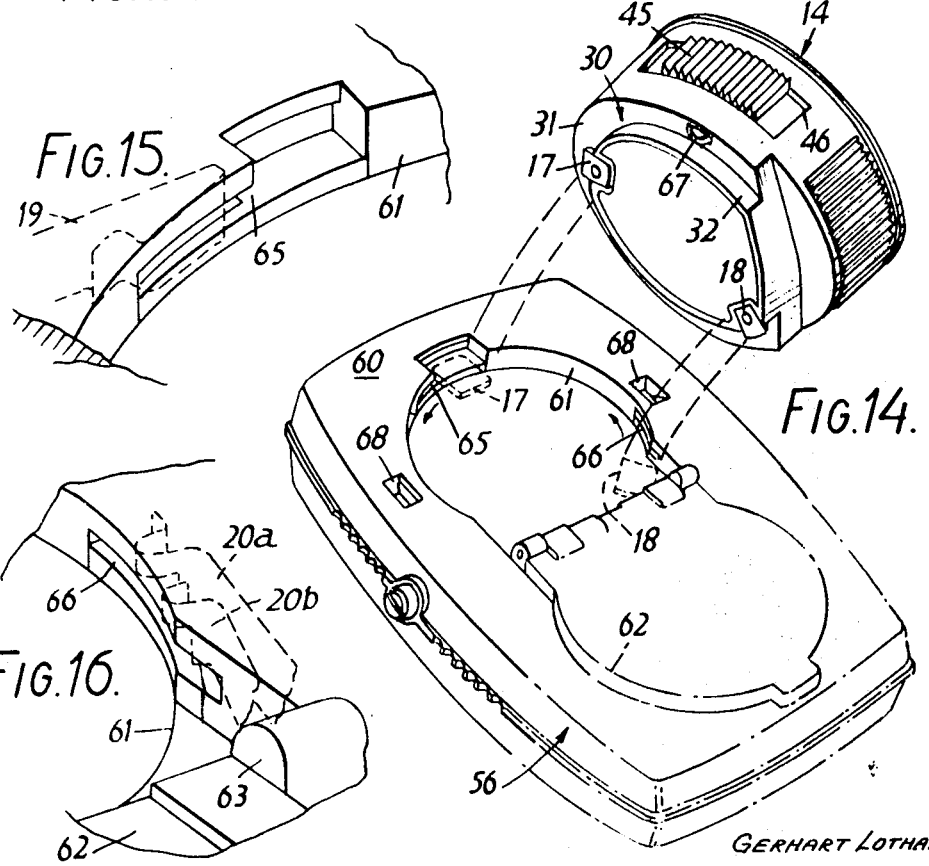

As shown clearly in FIGS. 14, 15 and 16, the attachment 14 is arranged by its extension 32 to interfit with the aforesaid circular opening 61 around the window of the cell in the exposure meter by an arrangement in which the projecting radial contact plates 17, 18 enter into slots 65 and 66 formed in the body of the meter casing. Such radial plates operate, after slight rotary movement of the attachment to secure it bayonet fixing fashion to make electrical connection with the spring blade contacts 19 and 20a, 20b thereby to establish the circuit arrangement shown in FIG. 3. As will be appreciated the insertion of such attachment into the recess 61 of the normal exposure meter automatically prevents access of light to the selenium cell embodied in the exposure meter. The attachment 14 is held located in its mounted position by the entry of resilient detents 67 into recesses 68 formed in the rear wall of the exposure meter casing.

While the invention has been more particularly described with reference to one specific form of exposure meter and using one particular design of attachment device therefor, it will be understood that numerous modifications may be made and an attachment device of suitable form arranged for cooperating with substantially any type of exposure meter.

I claim:

1. For a photoelectric exposure meter comprising a first casing having a first light entry aperture in a wall thereof, attachment holding means in the vicinity of the said first light entry aperture, a first photosensitive device located within said casing for exposure to light entering through said first light entry aperture, an electrical measuring instrument calibrated in light or equivalent photographic values, electric circuit means connecting said measuring instrument with said first photosensitive device to be energized by a current which varies in amplitude in accordance with the degree of illumination of said first photosensitive device by light entering said first light entry aperture and external electric connector means on said casing and connecting to said electrical measuring instrument, the improvement comprising an attachment for extending the measurement range of said meter to light values of lower intensity, which attachment comprises a second casing having a second light entry aperture in a wall thereof, a second photosensitive device located within said second casing for exposure to light entering through such second light entry aperture, external electrical connector means connected to said second photosensitive device and attachment means for cooperating with said attachment holding means on said first casing to hold said attachment in a position which closes said first light entry aperture against the passage of light therethrough onto such first photosensitive device and with said external electric connector means cooperating with the external electrical connector means of said first casing to connect said second photosensitive device to said electrical measuring instrument in an electric circuit by means of which said measuring instrument is energized in accordance only with the degree of illumination of said second photosensitive device.

3. An arrangement for measuring a plurality of different ranges of light intensity values which comprises a photoelectric exposure meter including a first casing having a first light entry aperture in a wall thereof, a first photosensitive device located within said casing for exposure to light entering through said light entry aperture, an electrical measuring instrument calibrated in light or equivalent photographic values, electric circuit means connecting said measuring instrument with such first photosensitive device to cause energization of such measuring instrument by a current which varies in amplitude in accordance with the degree of illumination of said first photosensitive device by light entering said light entry aperture, attachment holding means on said first casing in the vicinity of said first light entry aperture and external electric connector means electrically connected to said electrical measuring instrument and an attachment arranged for detachable mounting on said first casing and comprising a second photosensitive device, attachment means cooperating with said attachment holding means of said first casing to secure said attachment to said first casing in a position completely obscuring said first light entry aperture from the entry of light therethrough onto said first photosensitive device and external electric connector means cooperating with said external electric connector means connecting said second photosensitive device into the circuit of said electrical measuring instrument whereby said measuring instrument is energized solely in accordance with the illumination incident upon said second photosensitive device when said attachment is in position and whereby said measuring instrument is energized only in accordance with the degree of illumination incident upon said first photosensitive device when said attachment is removed from said meter.

3. An attachment according to claim 1 in which said second photosensitive device is of the photoresistive type and in which said attachment also carries a current source.

4. An attachment in accordance with claim 3 in which said second photosensitive device is a cadmium sulfide cell.

5. An attachment in accordance with claim 3 in which said attachment includes manually operable switch means by which said current source may be connected into operative circuit relationship with said second photosensitive device, disconnected or connected into a voltage test circuit which includes said electrical measuring instrument.

6. An attachment according to claim 1 which includes a transistor current amplifier for amplifying the output from said second photosensitive device.

7. An attachment according to claim 1 which carries an exposure calculator mechanism for dealing with the additional illumination measurement range provided thereby.

8. An attachment according to claim 1 in which said attachment holding means on said first casing and said attachment means on said second casing comprise a bayonet-type coupling.

9. An attachment according to claim 8 in which said bayonet-type coupling includes projecting metal parts which serve also as said external electric connector means on said first and second casings.

10. An arrangement according to claim 2 in which said second photosensitive device is of the photoresistive type and in which said attachment also includes a current source.

11. An arrangement according to claim 10 in which said second photosensitive device is a cadmium sulfide cell.

12. An arrangement according to claim 10 in which said attachment includes manually operable switch means for connecting and disconnecting said current source into and from operative circuit relationship with said second photosensitive device and for connecting such current source into a voltage test circuit which includes said electrical measuring instrument.

13. An arrangement according to claim 2 in which said attachment comprises a transistor current amplifier operative to amplify the output from said second photosensitive device.

14. An arrangement according to claim 2 in which said attachment comprises an exposure calculator mechanism for dealing with the additional illumination measurement range provided thereby.

15. An arrangement according to claim 2 in which said attachment holding means on said first casing and said attachment means on said second casing comprise a bayonet-type coupling.

16. An arrangement according to claim 15 in which said bayonet-type coupling includes cooperating metal parts which serve also as said external electric connector means on said first and second casings.

17. An arrangement according to claim 16 in which the operative circuit within said exposure meter is altered when said attachment is applied thereto and in which the application of said attachment is arranged automatically to effect the necessary circuit alteration.

18. An arrangement according to claim 17 in which the required circuit alteration is effected by bridging at least two contacts of said external electric connector means of said exposure meter with one of said bayonet-type connector members.